(12) United States Patent
Takahara et al.

(10) Patent No.: US 7,837,898 B2
(45) Date of Patent: Nov. 23, 2010

(54) GREEN LIGHT EMITTING PHOSPHOR

(75) Inventors: Takeshi Takahara, Suginami-ku (JP); Yasushi Aoki, Tokyo (JP); Takashi Murase, Tokyo (JP)

(73) Assignee: Nemoto & Co., Ltd., Tokyo (JP)

( * ) Notice: Subject to any disclaimer, the term of this patent is extended or adjusted under 35 U.S.C. 154(b) by 563 days.

(21) Appl. No.: 11/661,926

(22) PCT Filed: May 26, 2006

(86) PCT No.: PCT/JP2006/010526

§ 371 (c)(1),
(2), (4) Date: Nov. 12, 2007

(87) PCT Pub. No.: WO2006/129559

PCT Pub. Date: Dec. 7, 2006

(65) Prior Publication Data

US 2008/0061271 A1  Mar. 13, 2008

(30) Foreign Application Priority Data

May 30, 2005  (JP)  ............................... 2005-157732

(51) Int. Cl.
*C09K 11/61*  (2006.01)

(52) U.S. Cl. ......................... 252/301.4 F; 252/301.4 H (58) Field of Classification Search ........... 252/301.4 F, 252/301.4 H
See application file for complete search history.

(56) References Cited

U.S. PATENT DOCUMENTS

| 7,427,784 B2 * | 9/2008 | Liu et al. ...................... 257/99 |
| 7,700,002 B2 * | 4/2010 | Schmidt et al. ....... 252/301.4 F |
| 2009/0283721 A1 * | 11/2009 | Liu et al. .............. 252/301.4 H |

FOREIGN PATENT DOCUMENTS

| JP | 10-242513 | 9/1998 |
| JP | 2004 134805 | 4/2004 |
| JP | 2004 277547 | 10/2004 |

* cited by examiner

*Primary Examiner*—C. Melissa Koslow
(74) *Attorney, Agent, or Firm*—Oblon, Spivak, McClelland, Maier & Neustadt, L.L.P.

(57) ABSTRACT

A green-light-emitting phosphor of a high emission brightness when excited by blue light emitted from a blue LED is provided. The green-light-emitting phosphor is represented by a formula $M_{1-a}Si_2O_{2-1/2n}X_nN_2:Eu_a$, wherein M is at least one element of strontium (Sr), barium (Ba) and calcium (Ca); X is at least one element of chlorine (Cl) and bromine (Br); a is $0.005 \leq a \leq 0.15$ and n is $0.02 \leq n \leq 0.2$. Substitution of a part of the oxygen (O) in a matrix with at least one halogen element of chlorine (Cl) and bromine (Br) gives a green-light-emitting phosphor of higher brightness.

4 Claims, 1 Drawing Sheet

GREEN LIGHT EMITTING PHOSPHOR

TECHNICAL FIELD

The present invention relates to a phosphor which absorbs visible light in a short-wavelength region such as blue light and ultraviolet light and emits visible light of a longer wavelength such as green light. Further, the present invention relates to a phosphor from which, in combination with a light-emitting semiconductor element such as a light-emitting diode (LED) or a laser diode (LD), a white-light-emitting element of improved color-rendering properties can be composed.

BACKGROUND ART

It has long been known that visible light such as white light is obtained from a combination of phosphors which absorb visible light in a short-wavelength region such as blue light and ultraviolet light and changes the wavelength to visible light of a longer wavelength such as red and green light.

In particular, light-emitting elements emitting visible light such as white light, which is composed by combining a light-emitting semiconductor element, e.g., gallium nitride (GaN) blue LED as a light source of visible light in a short-wavelength region and ultraviolet light and a phosphor as a wavelength-conversion material, have characteristics of low power consumption and long operating life, and are recently attracting attention as light-emitting sources for visual display units and lighting systems.

In such light emitting elements, for example, a phosphor as a conversion material absorbs visible light in a blue light region emitted from a GaN blue LED and emits yellow light, which is further mixed with the blue light from the LED which is not absorbed by the phosphor to be white light (cf. Patent Document 1 below).

The yellow phosphor, however, has a problem that its brightness lowers when temperature rises.

Moreover, as stable phosphors when temperature rises, nitride phosphors and oxynitride phosphors are proposed (cf. Patent Documents 2 and 3 below). Of the documents, there is a description in Patent Document 3, for example, that a phosphor of a composition of an alkaline earth element (AE):silicon (Si):oxygen (O):nitrogen (N)=1:2:2:2 has the good property.

The substance has a crystal skeleton of a combination of $SiO_4$ tetrahedrons and $SiN_4$ tetrahedrons. The phosphors of the structure still do not have sufficient emission brightness and improvement has been required.

Patent Document 1: JP 10-242513 A (p. 2)

Patent Document 2: JP 2004-134805 A (pp. 2, 6 and 8)

Patent Document 3: JP 2004-277547 A (pp. 2 and 13)

DISCLOSURE OF THE INVENTION

In view of the aforementioned conventional arts, an object of the present invention is to provide an alkaline earth metal oxynitride phosphor of high brightness.

The present inventors have conducted various experiments to solve the above problems and, as a result, have found that a phosphor of high brightness can be obtained by substituting a part of the oxygen (O) element in a matrix of an oxynitride phosphor with halogen element.

A green-light-emitting phosphor according to a first invention of the present invention is represented by a formula $M_{1-a}Si_2O_{2-1/2n}X_nN_2:Eu_a$, wherein M is at least one element selected from a group consisting of strontium (Sr), barium (Ba) and calcium (Ca); X is at least one element selected from a group consisting of chlorine (Cl) and bromine (Br); and a is $0.005 \leq a \leq 0.15$ and n is $0.02 \leq n \leq 0.2$.

Then, as described above, substitution of a part of the oxygen (O) in a matrix with at least one halogen element selected from a group consisting of chlorine (Cl) and bromine (Br) represented by X gives a green-light-emitting phosphor of higher brightness.

Herein, when the amount n of the halogen element represented by X is more than 0.2, the amount of substitution is too large to be the intended structure of the phosphor of the present invention, and the emission brightness lowers. Moreover, when n is less than 0.02, the amount of substitution is insufficient and thus the resulting phosphor is not distinguishable from a conventional one.

Moreover, when a which represents the amount of europium (Eu) as an activator is more than 0.15, the emission brightness lowers due to concentration quenching. On the other hand, when a is less than 0.005, the concentration of the activator is insufficient and thus the emission brightness also lowers.

From these facts, a is set to $0.005 \leq a \leq 0.15$ and n is set to $0.02 \leq n \leq 0.2$, and thus a green-light-emitting phosphor of high brightness can be obtained.

A green-light-emitting phosphor according to a second invention of the present invention is represented by a formula $Sr_{1-a}Si_2O_{2-1/2n}X_nN_2:Eu_a$, wherein X is at least one element selected from a group consisting of chlorine (Cl) and bromine (Br); and a is $0.005 \leq a \leq 0.15$ and n is $0.02 \leq n \leq 0.2$.

Then, as described above, substitution of a part of the oxygen (O) in a matrix with at least one halogen element selected from the group consisting of chlorine (Cl) and bromine (Br) represented by X gives a green-light-emitting phosphor of higher brightness.

Herein, when the amount n of the halogen element represented by X is more than 0.2, the amount of substitution is too large to be the intended structure of the phosphor of the present invention, and the emission brightness lowers. Moreover, when n is less than 0.02, the amount of substitution is insufficient and thus the resulting phosphor is not distinguishable from a conventional one.

Moreover, when a which represents the amount of europium (Eu) as an activator is more than 0.15, the emission brightness lowers due to concentration quenching. On the other hand, when a is less than 0.005, the concentration of the activator is insufficient and thus the emission brightness also lowers.

From these facts, a is set to $0.005 \leq a \leq 0.15$ and n is set to $0.02 \leq n \leq 0.2$, and thus a green-light-emitting phosphor of high brightness can be obtained.

A green-light-emitting phosphor according to a third invention of the present invention is represented by a formula $(Sr_{1-b}Ba_b)_{1-a}Si_2O_{2-1/2n}X_nN_2:Eu_a$, wherein X is at least one element selected from a group consisting of chlorine (Cl) and bromine (Br); and a is $0.005 \leq a \leq 0.15$, b is $0 < b \leq 0.761$ and n is $0.02 \leq n \leq 0.2$.

Then, as described above, substitution of a part of the oxygen (O) in a matrix with at least one halogen element selected from the group consisting of chlorine (Cl) and bromine (Br) represented by X gives a green-light-emitting phosphor of higher brightness.

Herein, when the amount n of the halogen element represented by X is more than 0.2, the amount of substitution is too large to be the intended structure of the phosphor of the present invention, and the emission brightness lowers. Moreover, when n is less than 0.02, the amount of substitution is insufficient and thus the resulting phosphor is not distinguishable from a conventional one.

Moreover, when a which represents the amount of europium (Eu) as an activator is more than 0.15, the emission brightness lowers due to concentration quenching. On the other hand, when a is less than 0.005, the concentration of the activator is insufficient and thus the emission brightness also lowers.

Further, by increasing b, which represents the ratio of substitution of a part of the strontium (Sr) with barium (Ba), the luminous peak wavelength of the phosphor slightly shifts to the long wavelength region, and chromaticity x increases and chromaticity y decreases. The characteristic is preferred because increase of b makes it possible to control luminescent color particularly when obtaining a white light source by combining with a light-emitting semiconductor element such as light-emitting diode which emits blue light. However, cases in which b is more than 0.761 are not preferred because two emission peaks appear and due to mixing of colors of short wavelength components, visual brightness lowers.

From these facts, a is set to $0.005 \leq a \leq 0.15$, b is set to $0 < b \leq 0.761$ and n is set to $0.02 \leq n \leq 0.2$, and thus a green-light-emitting phosphor of high brightness can be obtained.

A green-light-emitting phosphor according to a fourth invention of the present invention is represented by a formula $(Sr_{1-b-c}Ba_bCa_c)_{1-a}Si_2O_{2-1/2n}X_nN_2:Eu_a$, wherein X is at least one element selected from a group consisting of chlorine (Cl) and bromine (Br); and a is $0.005 \leq a \leq 0.15$, c is $0 < c \leq 0.109$, (b+c) is $0 < (b+c) \leq 0.218$ and n is $0.02 \leq n \leq 0.2$.

Then, as described above, substitution of a part of the oxygen (O) in a matrix with at least a halogen element selected from the group consisting of chlorine (Cl) and bromine (Br) represented by X gives a green-light-emitting phosphor of higher brightness.

Herein, when the amount n of the halogen element represented by X is more than 0.2, the amount of substitution is too large to be the intended structure of the phosphor of the present invention, and the emission brightness lowers. Moreover, when n is less than 0.02, the amount of substitution is insufficient and thus the resulting phosphor is not distinguishable from a conventional one.

Moreover, when a which represents the amount of europium (Eu) as an activator is more than 0.15, the emission brightness lowers due to concentration quenching. On the other hand, when a is less than 0.005, the concentration of the activator is insufficient and thus the emission brightness also lowers.

Further, substitution of a part of the strontium (Sr) with calcium (Ca) or calcium and barium (Ba) is preferred because the luminous peak wavelength of the phosphor slightly shifts to the long wavelength region, making it possible to control luminescent color. However, cases in which c is more than 0.109 or (b+c) is more than 0.218 are not preferred because emission brightness lowers.

From these facts, a is set to $0.005 \leq a \leq 0.15$, c is set to $0 < c \leq 0.109$, (b+c) is set to $0 < (b+c) \leq 0.218$ and n is set to $0.02 \leq n \leq 0.2$, and thus a green-light-emitting phosphor of high brightness can be obtained.

According to the green-light-emitting phosphor of the first invention, which is represented by the formula $M_{1-a}Si_2O_{2-1/2n}X_nN_2:Eu_a$, wherein M is at least one element selected from a group consisting of strontium (Sr), barium (Ba) and calcium (Ca); X is at least one element selected from a group consisting of chlorine (Cl) and bromine (Br); and a is $0.005 \leq a \leq 0.15$ and n is $0.02 \leq n \leq 0.2$, an excellent green-light-emitting phosphor of high emission brightness can be obtained.

According to the green-light-emitting phosphor of the second invention, which is represented by the formula $Sr_{1-a}Si_2O_{2-1/2n}X_nN_2:Eu_a$, wherein X is at least one element selected from a group consisting of chlorine (Cl) and bromine (Br); and a is $0.005 \leq a \leq 0.15$ and n is $0.02 \leq n \leq 0.2$, an excellent green-light-emitting phosphor of high emission brightness, can be obtained.

According to the green-light-emitting phosphor of the third invention, which is represented by the formula $(Sr_{1-b}Ba_b)_{1-a}Si_2O_{2-1/2n}X_nN_2:Eu_a$, wherein X is at least one element selected from a group consisting of chlorine (Cl) and bromine (Br); and a is $0.005 \leq a \leq 0.15$, b is $0 < b < 0.761$ and n is $0.02 \leq n \leq 0.2$, an excellent green-light-emitting phosphor of high emission brightness can be obtained.

According to the green-light-emitting phosphor of the fourth invention, which is represented by the formula $(Sr_{1-b-c}Ba_bCa_c)_{1-a}Si_2O_{2-1/2n}X_nN_2:Eu_a$, wherein X is at least one element selected from a group consisting of chlorine (Cl) and bromine (Br); and a is $0.005 \leq a \leq 0.15$, c is $0 < c \leq 0.109$, (b+c) is $0 < (b+c) \leq 0.218$ and n is $0.02 \leq n \leq 0.2$, an excellent green-light-emitting phosphor of high emission brightness can be obtained.

BEST MODE FOR CARRYING OUT THE INVENTION

Hereinafter, the steps of producing a phosphor according to an embodiment of the present invention are described. A phosphor according to the present invention is obtained by mixing compounds containing component elements so as to attain a predetermined ratio and firing the resulting mixture under predetermined conditions.

For starting materials, compounds such as carbonate, oxide, nitride and fluoride containing Sr, Ca, Ba, Si and Eu (hereinafter referred to as "cationic element") can be used. Simple compounds containing only one cationic element or complex compounds containing two or more cationic elements may be used as starting materials.

The type and mixing ratio of starting materials are selected based on the composition of the phosphor to be prepared.

The mixed starting materials are fired under predetermined conditions. The preferable atmosphere for firing is a mixed gas atmosphere of hydrogen and nitrogen. The preferable concentration of the hydrogen gas is 1% to 5%.

The preferable firing temperature is 1200° C. to 1600° C. A firing temperature lower than 1200° C. is not preferable because the reaction speed in the solid-state reaction of the starting materials becomes lower. A firing temperature higher than 1600° C. is not preferable because the materials are significantly sintered and melted; —The more preferable firing temperature is 1300° C. to 1500° C.

The preferable firing time is 0.5 hour or more. A firing time less than 0.5 hour is not preferable because the solid-state reaction becomes so insufficient that good phosphor particles may be obtained. The more preferable firing time is 1 hour or more.

Being fired under such conditions, the intended oxynitride phosphor is obtained by a solid-state reaction. Since the phosphor immediately after firing is generally in the form of agglomerated powder, the synthesized powdery phosphor, for use as a phosphor for LED, should be formed into a product through the steps of dispersing, washing and sieving to attain a predetermined particle size.

The green-light-emitting phosphor of the present invention and properties thereof are now described referring to Examples of the above embodiment.

Example 1

In the beginning, properties of phosphors in which the substitution amount n of chlorine (Cl), as a halogen element in the composition, is changed are described.

First, 141.0 g of strontium carbonate ($SrCO_3$, 0.955 mol as Sr) as a raw material of strontium (Sr), 7.0 g of europium oxide ($Eu_2O_3$, 0.04 mol as Eu) as a raw material of europium (Eu), 30.1 g of silicon dioxide ($SiO_2$, 0.5 mole as Si) as a raw material of silicon (Si), 70.2 g of silicon nitride ($Si_3N_4$, 1.5 mol as Si and 2 mol as N) as a raw material of silicon and nitrogen (N) and 0.79 g of strontium chloride ($SrCl_2$, 0.005 mol as Sr and 0.01 mole as Cl) as a raw material of strontium and chlorine (Cl) were mixed sufficiently. The mixed powder was filled in an alumina crucible and fired in an atmosphere of 3% $H_2$+97% $N_2$ at 1400° C. for 1 hour. After firing, the resultant was subjected to dispersing and washing and passed through a 420-mesh sieve, and the resulting phosphor was referred to as Sample 1-(1).

The phosphor of Sample 1-(1) is represented by a formula $Sr_{0.96}Si_2O_{1.995}Cl_{0.11}N_2:Eu_{0.04}$.

Likewise, phosphors referred to as Samples 1-(2) to 1-(7) were prepared under the same conditions as in Sample 1-(1) except that the amount of substituted strontium chloride for the strontium carbonate was changed to 0.02, 0.05, 0.1, 0.15, 0.2 and 0.25 as the amount n of chlorine (Cl) as shown in Table 1.

Moreover, for comparison, a phosphor referred to as Control 1 was prepared under the same conditions as in Sample 1-(1) above except that no strontium chloride was added. This Control 1 is represented by $Sr_{0.96}Si_2O_2N_2:Eu_{0.04}$.

Figure 1:
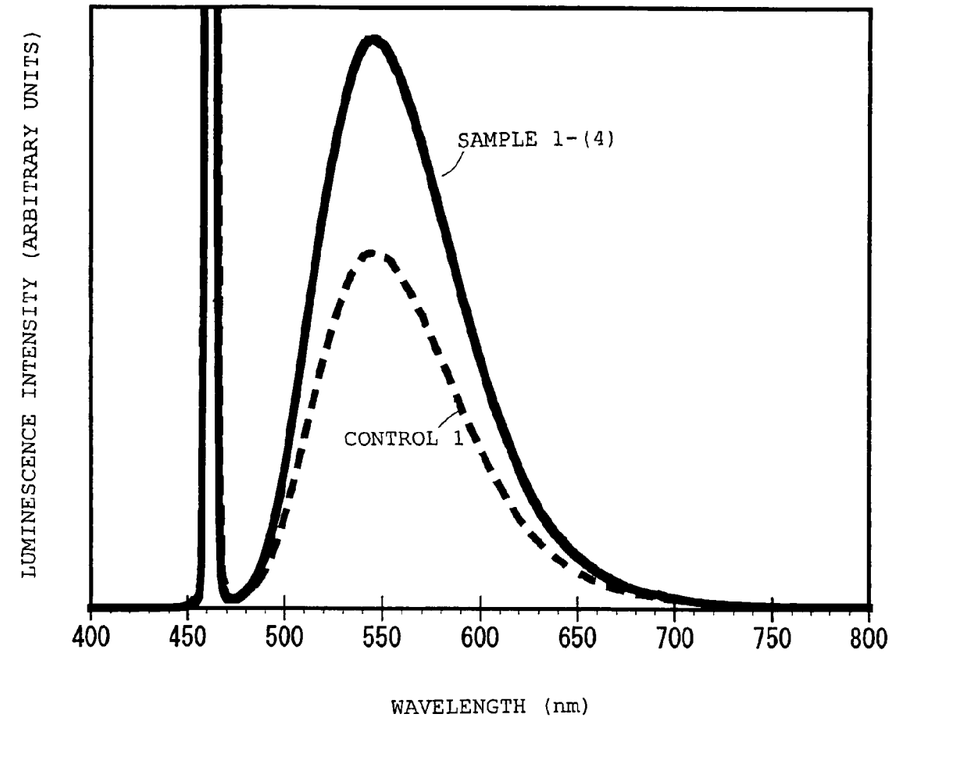
FIG. 1 A graph showing emission spectra of the green-light-emitting phosphor of an embodiment of the present invention and a conventional green-light-emitting phosphor when excited at 465 nm.

Of these results, the emission spectra of Control 1 and Sample 1-(4) are shown in FIG. 1. From this FIG. 1, comparison between Control 1 as an oxynitride phosphor of a conventional type and Sample 1-(4) as the present invention shows that each of them has an almost similar emission spectrum.

Further, brightness was calculated from the emission spectra by the following method. Namely, the luminescence intensity at each wavelength $\lambda$ being represented by $P(\lambda)$, the brightness B of the phosphor of the present invention is calculated by the following Formula 1.

[Formula 1]

In the Formula I, $V(\lambda)$ represented standard relative luminous efficiency, and intensities were integrated over the range of wavelength $\lambda$ of 470 nm to 700 nm. The brightness B thus obtained is shown in Table 2 as a relative brightness with the brightness of Control 1 as 100.

Furthermore, chromaticity x and chromaticity y were each calculated from the emission spectrum of Sample 1-(4). As a result, the chromaticity x was 0.382 and the chromaticity y was 0.589.

TABLE 2

| Sample | Formula | Amount n of Cl as halogen | Relative brightness |
|---|---|---|---|
| Control 1 | $Sr_{0.96}Si_2O_2N_2:Eu_{0.04}$ | 0 | 100 |
| Sample 1-(1) | $Sr_{0.96}Si_2O_{1.995}Cl_{0.01}N_2:Eu_{0.04}$ | 0.01 | 105 |
| Sample 1-(2) | $Sr_{0.96}Si_2O_{1.99}Cl_{0.02}N_2:Eu_{0.04}$ | 0.02 | 110 |
| Sample 1-(3) | $Sr_{0.96}Si_2O_{1.975}Cl_{0.05}N_2:Eu_{0.04}$ | 0.05 | 131 |
| Sample 1-(4) | $Sr_{0.96}Si_2O_{1.95}Cl_{0.1}N_2:Eu_{0.04}$ | 0.1 | 158 |
| Sample 1-(5) | $Sr_{0.96}Si_2O_{1.925}Cl_{0.15}N_2:Eu_{0.04}$ | 0.15 | 162 |
| Sample 1-(6) | $Sr_{0.96}Si_2O_{1.9}Cl_{0.2}N_2:Eu_{0.04}$ | 0.2 | 129 |
| Sample 1-(7) | $Sr_{0.96}Si_2O_{1.875}Cl_{0.25}N_2:Eu_{0.04}$ | 0.25 | 106 |

The results in Table 2 clearly show that the relative brightness of Samples 1-(2) to 1-(6) in which the amount n of chlorine (Cl) is 0.02 to 0.2 is advantageously higher than that in Control 1, and the more preferable amount n of chlorine (Cl) is 0.1 to 0.15.

TABLE 1

| Sample | $SrCO_3$ Sr(mol) | $Eu_2O_3$ Eu(mol) | $SiO_2$ Si(mol) | $Si_3N_4$ Si(mol) | $Si_3N_4$ N(mol) | $SrCl_2$ Sr(mol) | $SrCl_2$ Cl(mol) |
|---|---|---|---|---|---|---|---|
| Control 1 | 0.96 | 0.04 | 0.5 | 1.5 | 2 | 0 | 0 |
| Sample 1-(1) | 0.955 | 0.04 | 0.5 | 1.5 | 2 | 0.005 | 0.01 |
| Sample 1-(2) | 0.95 | 0.04 | 0.5 | 1.5 | 2 | 0.01 | 0.02 |
| Sample 1-(3) | 0.935 | 0.04 | 0.5 | 1.5 | 2 | 0.025 | 0.05 |
| Sample 1-(4) | 0.91 | 0.04 | 0.5 | 1.5 | 2 | 0.05 | 0.1 |
| Sample 1-(5) | 0.885 | 0.04 | 0.5 | 1.5 | 2 | 0.075 | 0.15 |
| Sample 1-(6) | 0.86 | 0.04 | 0.5 | 1.5 | 2 | 0.1 | 0.2 |
| Sample 1-(7) | 0.835 | 0.04 | 0.5 | 1.5 | 2 | 0.125 | 0.25 |

Next, light emission characteristics of the resulting Samples 1-(1) to 1-(7) and Control 1 were measured.

For the light emission characteristics, the emission spectrum was first measured using a spectrofluorimeter (model: F-4500, Hitachi, Ltd.). Each sample was put in a cell for powdery sample with a quartz glass window and irradiated with light an excitation wavelength of 465 nm in a blue light region to measure the emission spectrum.

On the other hand, in Sample 1-(1) in which the amount n of chlorine (Cl) is 0.01, which is less than 0.02, its relative brightness is almost the same as that in Control 1 which is a conventional phosphor in which n=0, i.e., chlorine is not used, and little effect is produced. Moreover, Sample 1-(7), in which the amount n of chlorine (Cl) is 0.25, which is more than 0.2, tends to have decreased brightness, and is also not preferable.

The above results show that the amount n of chlorine (Cl) is preferably 0.02 to 0.2, more preferably 0.1 to 0.15.

Example 2

Properties of the phosphor of the present invention in which the amount a of europium (Eu) as an activator is changed are now described.

Phosphors referred to as Samples 2-(1) to 2-(7) were prepared in the same manner as in the method of producing Sample 1-(5) in Example 1 except that the amounts of strontium carbonate and europium oxide were changed from 0.002 to 0.2 in terms of the amount a of europium shown in Table 3.

TABLE 3

| | $SrCO_3$ | $Eu_2O_3$ | $SiO_2$ | $Si_3N_4$ | | $SrCl_2$ | |
|---|---|---|---|---|---|---|---|
| Sample | Sr(mol) | Eu(mol) | Si(mol) | Si(mol) | N(mol) | Sr(mol) | Cl(mol) |
| Sample 2-(1) | 0.923 | 0.002 | 0.5 | 1.5 | 2 | 0.075 | 0.15 |
| Sample 2-(2) | 0.92 | 0.005 | 0.5 | 1.5 | 2 | 0.075 | 0.15 |
| Sample 2-(3) | 0.915 | 0.01 | 0.5 | 1.5 | 2 | 0.075 | 0.15 |
| Sample 1-(5) | 0.885 | 0.04 | 0.5 | 1.5 | 2 | 0.075 | 0.15 |
| Sample 2-(4) | 0.845 | 0.08 | 0.5 | 1.5 | 2 | 0.075 | 0.15 |
| Sample 2-(5) | 0.825 | 0.1 | 0.5 | 1.5 | 2 | 0.075 | 0.15 |
| Sample 2-(6) | 0.775 | 0.15 | 0.5 | 1.5 | 2 | 0.075 | 0.15 |
| Sample 2-(7) | 0.725 | 0.2 | 0.5 | 1.5 | 2 | 0.075 | 0.15 |

The brightness of Samples 2-(1) to 2-(7) thus obtained was measured in the same manner as in Example 1 and the results are shown in Table 4 as a relative brightness with respect to the brightness in Control 1 together with the result of Sample 1-(5).

TABLE 4

| Sample | Formula | Amount a of Eu | Relative brightness |
|---|---|---|---|
| Control 1 | $Sr_{0.96}Si_2O_2N_2:Eu_{0.04}$ | | 100 |
| Sample 2-(1) | $Sr_{0.998}Si_2O_{1.925}Cl_{0.15}N_2:Eu_{0.002}$ | 0.002 | 105 |
| Sample 2-(2) | $Sr_{0.995}Si_2O_{1.925}Cl_{0.15}N_2:Eu_{0.005}$ | 0.005 | 119 |
| Sample 2-(3) | $Sr_{0.99}Si_2O_{1.925}Cl_{0.15}N_2:Eu_{0.01}$ | 0.01 | 134 |
| Sample 1-(5) | $Sr_{0.96}Si_2O_{1.925}Cl_{0.15}N_2:Eu_{0.04}$ | 0.04 | 162 |
| Sample 2-(4) | $Sr_{0.92}Si_2O_{1.925}Cl_{0.15}N_2:Eu_{0.08}$ | 0.08 | 163 |
| Sample 2-(5) | $Sr_{0.9}Si_2O_{1.925}Cl_{0.15}N_2:Eu_{0.1}$ | 0.1 | 156 |
| Sample 2-(6) | $Sr_{0.85}Si_2O_{1.925}Cl_{0.15}N_2:Eu_{0.15}$ | 0.15 | 127 |
| Sample 2-(7) | $Sr_{0.80}Si_2O_{1.925}Cl_{0.15}N_2:Eu_{0.2}$ | 0.2 | 105 |

The results in Table 4 show that the relative brightness of Samples 2-(2) to 2-(6) and Sample 1-(5) in which the amount a of europium is 0.005 to 0.15 is advantageously higher than that in Control 1. Further, the results show that Sample 2-(4), Sample 2-(5) and Sample 1-(5), in which the amount a of europium is 0.04 to 0.1, are excellent phosphors with a higher relative brightness of 150 or more.

On the other hand, in Sample 2-(1) in which the amount a of europium is 0.002, which is less than 0.005, its relative brightness is decreased because the concentration of europium as the activator is insufficient. In Sample 2-(7) in which the amount a of europium is 0.2, which is more than 0.15, its relative brightness is also decreased due to concentration quenching.

These results show that the amount a of europium (Eu) is preferably 0.005 to 0.15, more preferably 0.04 to 0.1.

Example 3

Properties of phosphors of the present invention in which a part of the strontium (Sr) is substituted with barium (Ba) are now described.

First, 111.19 g of strontium carbonate ($SrCO_3$, 0.7532 mol as Sr) as a raw material of strontium (Sr), 18.12 g of barium carbonate ($BaCO_3$, 0.0918 mol as Ba) as a raw material of barium (Ba), 10.59 g of strontium chloride ($SrCl_2$, 0.0668 mol as Sr and 0.1336 mole as Cl) as a raw material of strontium and chlorine (Cl), 1.71 g of barium chloride ($BaCl_2$, 0.0082 mol as Ba and 0.0164 mol as Cl) as a raw material of barium and chlorine, 14.1 g of europium oxide ($Eu_2O_3$, 0.08 mol as Eu) as a raw material of europium (Eu), 30.1 g of silicon dioxide ($SiO_2$, 0.5 mol as Si) as a raw material of silicon (Si) and 70.2 g of silicon nitride ($Si_3N_4$, 1.5 mol as Si and 2 mol as N) as a raw material of silicon and nitrogen (N) are mixed sufficiently. The mixed powder is filled in an alumina crucible and fired in an atmosphere of 3% $H_2$+97% $N_2$ at 1400° C. for 1 hour. After firing, the resultant was subjected to dispersing and washing and passed through a 420-mesh sieve, and the resulting phosphor was referred to as Sample 3-(1).

The phosphor of Sample 3-(1) is represented by a formula $Sr_{0.82}Ba_{0.1}Si_2O_{1.925}Cl_{0.15}N_2:Eu_{0.08}$.

Moreover, a control phosphor was prepared under the same conditions as in the Sample 3-(1) above except that strontium carbonate and barium carbonate were used instead of strontium chloride and barium chloride. The control phosphor corresponding to Sample 3-(1) is represented by a formula $Sr_{0.82}Ba_{0.1}Si_2O_2N_2:Eu_{0.08}$.

Likewise, phosphors referred to as Samples 3-(2) to 3-(7) were prepared under the same conditions as in Sample 3-(1) except that the amounts of strontium and barium were changed as shown in Table 5. Control phosphors were also prepared for each of Samples 3-(2) to 3-(7) as in the case of Sample 3-(1).

TABLE 5

| Common conditions $Eu_2O_3$:Eu = 0.08 mol $SiO_2$:Si = 0.5 mol/$Si_3N_4$:Si = 1.5 mol, N = 2 mol | | | | | |
|---|---|---|---|---|---|
| Sample | $SrCO_3$ Sr(mol) | $BaCO_3$ Ba(mol) | $SrCl_2$ Sr(mol) | $BaCl_2$ Ba(mol) | (Common to all samples) Cl(mol) |
| Sample 3-(1) | 0.7532 | 0.0918 | 0.0668 | 0.0082 | 0.15 |
| Sample 3-(2) | 0.6613 | 0.1837 | 0.0587 | 0.0163 | 0.15 |

TABLE 5-continued

Common conditions
$Eu_2O_3$:Eu = 0.08 mol
$SiO_2$:Si = 0.5 mol/$Si_3N_4$:Si = 1.5 mol, N = 2 mol

| Sample | $SrCO_3$ Sr(mol) | $BaCO_3$ Ba(mol) | $SrCl_2$ Sr(mol) | $BaCl_2$ Ba(mol) | (Common to all samples) Cl(mol) |
|---|---|---|---|---|---|
| Sample 3-(3) | 0.5695 | 0.2755 | 0.0505 | 0.0245 | 0.15 |
| Sample 3-(4) | 0.3857 | 0.4593 | 0.0343 | 0.0407 | 0.15 |
| Sample 3-(5) | 0.2021 | 0.6429 | 0.0179 | 0.0571 | 0.15 |
| Sample 3-(6) | 0.0643 | 0.7807 | 0.0057 | 0.0693 | 0.15 |
| Sample 3-(7) | 0 | 0.845 | 0 | 0.075 | 0.15 |

The brightness of Samples 3-(1) to 3-(7) and the control phosphors thus obtained was measured in the same manner as in Example 1 and the results are shown in Table 6 as a relative brightness with respect to the brightness of the control phosphors. Furthermore, chromaticity x, chromaticity y and the luminous peak wavelength were each calculated from the resulting emission spectrum and also shown in Table 6. In the table, the ratio b of barium represents the ratio of the number of moles of barium to the total number of moles of strontium and barium, i.e., b=Ba/(Sr+Ba).

TABLE 6

| Sample | Amount of Sr | Amount of Ba | b | Relative brightness based on that of phosphor with no Cl | Chromaticity x | Chromaticity y | Luminous peak wavelength (nm) |
|---|---|---|---|---|---|---|---|
| Sample 3-(1) | 0.82 | 0.1 | 0.109 | 191 | 0.402 | 0.573 | 549 |
| Sample 3-(2) | 0.72 | 0.2 | 0.217 | 166 | 0.410 | 0.567 | 550 |
| Sample 3-(3) | 0.62 | 0.3 | 0.326 | 178 | 0.420 | 0.560 | 555 |
| Sample 3-(4) | 0.42 | 0.5 | 0.543 | 183 | 0.464 | 0.523 | 570 |
| Sample 3-(5) | 0.22 | 0.7 | 0.761 | 215 | 0.500 | 0.492 | 582 |
| Sample 3-(6) | 0.07 | 0.85 | 0.924 | 198 | 0.451 | 0.491 | 497; 582 |
| Sample 3-(7) | 0 | 0.92 | 1 | 135 | 0.366 | 0.491 | 498; 588 |

The results in Table 6 show that the relative brightness of Samples 3-(1) to 3-(7) in which the ratio b of barium is 0.109 to 1 is advantageously higher than that of the control phosphors which do not contain chlorine. Further, the results show that Samples 3-(1) to 3-(5), in which the ratio b of barium is 0.109 to 0.761, have only one emission peak, and judging from the chromaticity x, chromaticity y, luminous peak wavelength and emission spectrum (not shown), these samples are excellent phosphors with higher visual brightness.

On the other hand, Sample 3-(6) in which the ratio b of barium is 0.924 and Sample 3-(7) in which the ratio b of barium is 1, both of which are higher than 0.761, have two separated emission peaks. In addition, since the second peak appears in the shorter wavelength region, the visual brightness tends to lower. Therefore, these samples are less preferable than the above Samples 3-(1) to 3-(5).

Furthermore, other phosphors in which the ratio b of barium is less than 0.109 were examined in the same manner, and as a result, the effect of improvement in the relative brightness by chlorine was also observed.

The results show that when barium is added, the ratio b of barium relative to the total number of moles of strontium and barium is preferably 0.761 or less.

Example 4

Properties of phosphors of the present invention in which a part of the strontium (Sr) is substituted with calcium (Ca) and with calcium (Ca) and barium (Ba) are now described.

First, 110.0 g of strontium carbonate ($SrCO_3$, 0.745 mol as Sr) as a raw material of strontium (Sr), 5.0 g of calcium carbonate ($CaCO_3$, 0.05 mol as Ca) as a raw material of calcium (Ca), 9.87 g of barium carbonate ($BaCO_3$, 0.05 mol as Ba) as a raw material of barium (Ba), 14.1 g of europium oxide ($Eu_2O_3$, 0.08 mol in terms of Eu) as a raw material of europium (Eu), 30.1 g of silicon dioxide ($SiO_2$, 0.5 mole as Si) as a raw material of silicon (Si), 70.2 g of silicon nitride ($Si_3N_4$, 1.5 mol as Si and 2 mol as N) as a raw material of silicon and nitrogen (N) and 11.9 g of strontium chloride ($SrCl_2$, 0.075 mol as Sr and 0.15 mol as Cl) as a raw material of strontium and chlorine (Cl) are mixed sufficiently. The mixed powder is filled in an alumina crucible and fired in an atmosphere of 3% $H_2$+97% $N_2$ at 1400° C. for 1 hour. After firing, the resultant was subjected to dispersing and washing and passed through a 420-mesh sieve, and the resulting phosphor was referred to as Sample 4-(3).

The phosphor of Sample 4-(3) is represented by a formula $Sr_{0.82}Ba_{0.05}Ca_{0.05}Si_2O_{1.925}Cl_{0.15}N_2$:$Eu_{0.08}$.

Likewise, phosphors referred to as Samples 4-(1), 4-(2) and 4-(4) to 4-(7) were prepared under the same conditions as in Sample 4-(3) except that the amounts of substituted barium and calcium for strontium were changed as shown in Table 5.

TABLE 7

Common condition
$Eu_2O_3$:Eu = 0.08 mol
$SiO_2$:Si = 0.5 mol/$Si_3N_4$:Si = 1.5 mol, N = 2 mol

| Sample | $SrCO_3$ Sr(mol) | $BaCO_3$ Ba(mol) | $CaCO_3$ Ca(mol) | $SrCl_2$ Sr(mol) | Cl(mol) |
|---|---|---|---|---|---|
| Sample 4-(1) | 0.82 | 0 | 0.05 | 0.05 | 0.1 |
| Sample 4-(2) | 0.695 | 0 | 0.1 | 0.125 | 0.25 |
| Sample 4-(3) | 0.745 | 0.05 | 0.05 | 0.075 | 0.15 |
| Sample 4-(4) | 0.705 | 0.05 | 0.1 | 0.065 | 0.13 |
| Sample 4-(5) | 0.67 | 0.15 | 0.05 | 0.05 | 0.1 |
| Sample 4-(6) | 0.67 | 0.1 | 0.1 | 0.05 | 0.1 |
| Sample 4-(7) | 0.62 | 0 | 0.25 | 0.05 | 0.1 |

The brightness of Samples 4-(1) to 4-(7) thus obtained was measured in the same manner as in Example 1 and the results are shown in Table 8 as a relative brightness with respect to the brightness in Control 1. In the table, the ratio b of barium represents the ratio of the number of moles of barium to the total number of moles of strontium, barium and calcium, i.e., b=Ba/(Sr+Ba+Ca). Likewise, the ratio c of calcium represents c=Ca/(Sr+Ba+Ca).

TABLE 8

| Sample | Amount of Sr | Amount of Ba | Amount of Ca | b | c | b + c | Relative brightness |
|---|---|---|---|---|---|---|---|
| Control 1 | | | | | | | 100 |
| Sample 4-(1) | 0.87 | 0 | 0.05 | 0 | 0.054 | 0.054 | 155 |
| Sample 4-(2) | 0.82 | 0 | 0.1 | 0 | 0.109 | 0.109 | 142 |
| Sample 4-(3) | 0.82 | 0.05 | 0.05 | 0.054 | 0.054 | 0.108 | 140 |
| Sample 4-(4) | 0.77 | 0.05 | 0.1 | 0.054 | 0.109 | 0.163 | 136 |
| Sample 4-(5) | 0.72 | 0.15 | 0.05 | 0.163 | 0.054 | 0.217 | 123 |
| Sample 4-(6) | 0.72 | 0.1 | 0.1 | 0.109 | 0.109 | 0.218 | 120 |
| Sample 4-(7) | 0.67 | 0 | 0.25 | 0 | 0.272 | 0.272 | 105 |

The results in Table 8 show that the relative brightness of each of Samples 4-(1) to 4-(6) is advantageously higher than that of Control 1. It is also shown that in Samples 4-(1) to 4-(6), (b+c), which represents the sum of the ratio b of barium and the ratio c of calcium, is 0.054 to 0.218, and the ratio c of calcium is 0.054 to 0.109. Further, it is shown that Samples 4-(1) to 4-(3) in which (b+c) is 0.108 or less are excellent phosphors with superior properties.

On the other hand, Sample 4-(7), in which (b+c) is 0.272, which is higher than 0.218, has decreased relative brightness.

These results show that when the phosphor of the present invention contains calcium, preferably (b+c), which represents the sum of the ratio b of barium and the ratio c of calcium, is more than 0 and 0.218 or less, and the ratio c of calcium is more than 0 and 0.109 or less, and more preferably (b+c) is 0.109 or less.

Furthermore, the preferable range of b is determined to be $0 \leq b < 0.218$ from $0 < (b+c) \leq 0.218$ and $0 < c \leq 0.109$ described above.

Example 5

Properties of phosphors of the present invention in which a part or all of the chlorine (Cl) is substituted with bromine (Br) are now described.

First, 124.75 g of strontium carbonate ($SrCO_3$, 0.845 mol in terms of Sr) as a raw material of strontium (Sr), 7.93 g of strontium chloride ($SrCl_2$, 0.05 mol as Sr and 0.1 mol as Cl) as a raw material of strontium and chlorine (Cl), 6.19 g of strontium bromide ($SrBr_2$, 0.025 mol as Sr, 0.05 mol as Br) as a raw material of strontium and bromine (Br), 14.1 g of europium oxide ($Eu_2O_3$, 0.08 mol as Eu) as a raw material of europium (Eu), 30.1 g of silicon dioxide ($SiO_2$, 0.5 mol as Si) as a raw material of silicon (Si) and 70.2 g of silicon nitride ($Si_3N_4$, 1.5 mol as Si and 2 mol as N) as a raw material of silicon and nitrogen (N) are mixed sufficiently. The mixed powder is filled in an alumina crucible and fired in an atmosphere of 3% $H_2$+97% $N_2$ at 1400° C. for 1 hour. After firing, the resultant was subjected to dispersing and washing and passed through a 420-mesh sieve, and the resulting phosphor was referred to as Sample 5-(2).

The phosphor of Sample 5-(2) is represented by a formula $Sr_{0.92}Si_2O_{1.925}Cl_{0.1}Br_{0.05}N_2:Eu_{0.08}$. Herein, the amount n of halogen elements, which is the total amount of chlorine and bromine, is 0.15.

Likewise, the amount n of halogen elements was set to 0.15, and phosphors referred to as Samples 5-(1), 5-(3) and 5-(4) were produced under the same conditions as in Sample 5-(2) except that the amounts of chlorine and bromine were changed as shown in Table 9.

Moreover, for comparison, a phosphor referred to as Control 2 was prepared under the same conditions as in the Sample 5-(2) above except that no halogen element was used. The phosphor of Control 2 is represented by a formula $Sr_{0.92}Si_2O_2N_2:Eu_{0.08}$.

Further, phosphors in which strontium and barium were used were examined in the same manner. In that case, phosphors referred to as Samples 5-(5) and 5-(6) were produced in the same manner as in Sample 5-(2) and others, except that strontium bromide ($SrBr_2$) and barium bromide ($BaBr_2$) were used as a material of bromine and the amounts of chlorine and bromine were set as shown in Table 9. For example, the phosphor of Sample 5-(5) is represented by the formula $Sr_{0.42}Ba_{0.5}Si_2O_{1.925}Cl_{0.1}Br_{0.05}N_2:Eu_{0.08}$.

Furthermore, for comparison in this case, a sample in which no halogen element was used was prepared as Control 3. The phosphor of Control 3 is represented by the formula $Sr_{0.42}Ba_{0.5}Si_2O_2N_2:Eu_{0.08}$.

TABLE 9

| | Common conditions $Eu_2O_3$:Eu = 0.08 mol $SiO_2$:Si = 0.5 mol/$Si_3N_4$:Si = 1.5 mol, N = 2 mol | | | | | |
|---|---|---|---|---|---|---|
| Sample | $SrCO_3$ Sr(mol) | $BaCO_3$ Ba(mol) | $SrCl_2$ (mol) | $SrBr_2$ (mol) | $BaCl_2$ (mol) | $BaBr_2$ (mol) |
| Control 2 | 0.92 | — | 0 | 0 | — | — |
| Sample 5-(1) | 0.845 | — | 0.07 | 0.005 | — | — |
| Sample 5-(2) | 0.845 | — | 0.05 | 0.025 | — | — |
| Sample 5-(3) | 0.845 | — | 0.025 | 0.05 | — | — |
| Sample 5-(4) | 0.845 | — | 0 | 0.075 | — | — |
| Control 3 | 0.42 | 0.5 | 0 | 0 | 0 | 0 |
| Sample 5-(5) | 0.3825 | 0.4625 | 0.025 | 0.0125 | 0.025 | 0.0125 |
| Sample 5-(6) | 0.3825 | 0.4625 | 0 | 0.0375 | 0 | 0.0375 |

The brightness of Samples 5-(1) to 5-(6) thus obtained was measured in the same manner as in Example 1 and the results of Samples 5-(1) to 5-(4) are shown as a relative brightness with respect to the brightness in Control 2, and the results of Samples 5-(5) and 5-(6) are shown as a relative brightness with respect to the brightness in Control 3 in Table 10.

TABLE 10

| Sample | Amount of Sr | Amount of Ba | b | Amount of Cl | Amount of Br | Relative brightness based on that of phosphor with no halogen |
|---|---|---|---|---|---|---|
| Control 2 | 0.92 | 0 | 0 | — | — | 100 |
| Sample 5-(1) | | | | 0.14 | 0.01 | 154 |
| Sample 5-(2) | | | | 0.1 | 0.05 | 125 |
| Sample 5-(3) | | | | 0.05 | 0.1 | 126 |
| Sample 5-(4) | | | | 0 | 0.15 | 131 |
| Control 3 | 0.42 | 0.5 | 0.543 | — | — | 100 |

TABLE 10-continued

| Sample | Amount of Sr | Amount of Ba | b | Amount of Cl | Amount of Br | Relative brightness based on that of phosphor with no halogen |
|---|---|---|---|---|---|---|
| Sample 5-(5) | | | | 0.1 | 0.05 | 181 |
| Sample 5-(6) | | | | 0 | 0.15 | 179 |

The results in Table 10 show that the relative brightness of each of Samples 5-(1) to 5-(6) in which a part or all of the chlorine was substituted with bromine is advantageously higher than that in the respective Control 2 or Control 3.

These results show that even substitution of a part or all of the chlorine with bromine as a halogen element to be used is advantageous.

Example 6

Properties of phosphors of the present invention which contains other halogen element such as fluorine (F) and/or iodine (I) in addition to halogen elements such as chlorine (Cl) and/or bromine (Br) are now described.

First, 130.65 g of strontium carbonate ($SrCO_3$, 0.885 mol as Sr) as a raw material of strontium (Sr), 10.7 g of strontium chloride ($SrCl_2$, 0.0675 mole as Sr and 0.135 mol as Cl) as a raw material of strontium and chlorine (Cl), 0.94 g of strontium fluoride ($SrF_2$, 0.0075 mol as Sr and 0.015 mol as F) as a raw material of strontium and fluorine (F), 7.0 g of europium oxide ($Eu_2O_3$, 0.04 mol as Eu) as a raw material of europium (Eu), 30.1 g of silicon dioxide ($SiO_2$, 0.5 mole as Si) as a raw material of silicon (Si) and 70.2 g of silicon nitride ($Si_3N_4$, 1.5 mol as Si and 2 mol as N) as a raw material of silicon and nitrogen (N) are mixed sufficiently. The mixed powder is filled in an alumina crucible and fired in an atmosphere of 3% $H_2$+97% $N_2$ at 1400° C. for 1 hour. After firing, the resultant was subjected to dispersing and washing and passed through a 420-mesh sieve, and the resulting phosphor was referred to as Sample 6-(1).

The phosphor of Sample 6-(1) is represented by a formula $Sr_{0.92}Si_2O_{1.925}Cl_{0.135}F_{0.015}N_2:Eu_{0.04}$.

Likewise, phosphors referred to as Samples 6-(2) to 6-(5) were produced under the same conditions as in Sample 6-(1) except that the amount of fluorine and/or iodine which was added as a halogen element in addition to chlorine or bromine was changed as shown in Table 11.

TABLE 11

Common conditions
$SrCO_3$:Sr = 0.885/$Eu_2O_3$:Eu = 0.04 mol
$SiO_2$:Si = 0.5 mol/$Si_3N_4$:Si = 1.5 mol, N = 2 mol

| Sample | $SrCl_2$ Cl(mol) | $SrBr_2$ Br(mol) | $SrF_2$ F(mol) | $SrI_2$ I(mol) | (Common to all samples) Sr(mol) |
|---|---|---|---|---|---|
| Sample 6-(1) | 0.135 | — | 0.015 | — | 0.075 |
| Sample 6-(2) | 0.127 | 0.006 | — | 0.017 | 0.075 |
| Sample 6-(3) | 0.12 | — | — | 0.03 | 0.075 |
| Sample 6-(4) | 0.127 | 0.004 | 0.004 | 0.015 | 0.075 |
| Sample 6-(5) | 0.112 | 0.01 | 0.012 | 0.016 | 0.075 |

The brightness of Samples 6-(1) to 6-(5) thus obtained was measured in the same manner as in Example 1 and the results are shown in Table 12 as a relative brightness with respect to the brightness in Control 1.

TABLE 12

| Sample | Cl + Br/ Cl + Br + F + I | F/ Cl + Br + F + I | I/ Cl + Br + F + I | F + I/ Cl + Br + F + I | Relative brightness |
|---|---|---|---|---|---|
| Control 1 | | | | | 100 |
| Sample 6-(1) | 0.9 | 0.1 | — | 0.1 | 153 |
| Sample 6-(2) | 0.887 | — | 0.113 | 0.113 | 140 |
| Sample 6-(3) | 0.8 | — | 0.2 | 0.2 | 122 |
| Sample 6-(4) | 0.873 | 0.027 | 0.1 | 0.127 | 150 |
| Sample 6-(5) | 0.813 | 0.08 | 0.107 | 0.187 | 104 |

The results in Table 12 show that the relative brightness of each of Samples 6-(1) to 6-(4) is advantageously higher than that of Control 1. Herein, Sample 6-(1) contains fluorine (F) in a molar ratio of 0.1 and Samples 6-(2) and 6-(3) contain iodine (I) in a molar ratio of 0.2 or less based on the whole halogen elements. Moreover, Sample 6-(4) contains fluorine and iodine in a molar ratio of 0.127 in total based on the whole halogen elements.

On the other hand, Sample 6-(5) containing fluorine and iodine in a molar ratio of 0.187 in total based on the whole halogen elements shows no improvement in the relative brightness compared to Control 1.

These results show that the phosphor of the present invention may also contain a slight amount of halogen element other than chlorine or bromine. The results also show that when fluorine alone or iodine alone is used, the amount may be up to about 0.2 in a molar ratio based on the whole halogen elements, and when both fluorine and iodine are contained, the amount is desirably about 0.13 in a molar ratio based on the whole halogen elements.

INDUSTRIAL APPLICABILITY

By combining the green-light-emitting phosphor of the present invention with a light-emitting element which emits visible light in a short-wavelength region such as blue light, a white-light-emitting element can be formed by color-mixing with visible light in a long-wavelength region emitted from the phosphor. Further, an excellent white-light-emitting element of higher brightness can be formed by using a light-emitting diode or laser diode as a light-emitting element in combination with the green-light-emitting phosphor of the present invention.

These white-visible-light-emitting elements can be widely used as a light-emitting source for visual display units or lighting systems utilizing the characteristics of low power consumption and long operating life.

FIG. 1
1 LUMINESCENCE INTENSITY (ARBITRARY UNITS)
2 SAMPLE 1-(4)
3 CONTROL 1
4 WAVELENGTH (nm)

The invention claimed is:
1. A green-light-emitting phosphor represented by a formula $M_{1-a}Si_2O_{2-1/2n}X_nN_2:Eu_a$, wherein M is at least one element selected from a group consisting of strontium (Sr), barium (Ba) and calcium (Ca);

X is at least one element selected from a group consisting of chlorine (Cl) and bromine (Br); and a is $0.005 \leq a \leq 0.15$ and n is $0.02 \leq n \leq 0.2$.

2. A green-light-emitting phosphor represented by a formula $Sr_{1-a}Si_2O_{2-1/2n}X_nN_2:Eu_a$, wherein X is at least one element selected from a group consisting of chlorine (Cl) and bromine (Br); and a is $0.005 \leq a \leq 0.15$ and n is $0.02 \leq n \leq 0.2$.

3. A green-light-emitting phosphor represented by a formula $(Sr_{1-b}Ba_b)_{1-a}Si_2O_{2-1/2n}X_nN_2:Eu_a$, wherein X is at least one element selected from a group consisting of chlorine (Cl) and bromine (Br); and a is $0.005 \leq a \leq 0.15$, b is $0 < b \leq 0.761$ and n is $0.02 \leq n \leq 0.2$.

4. A green-light-emitting phosphor represented by a formula $(Sr_{1-b-c}Ba_bCa_c)_{1-a}Si_2O_{2-1/2n}X_nN_2:Eu_a$, wherein X is at least one element selected from a group consisting of chlorine (Cl) and bromine (Br); and a is $0.005 \leq a \leq 0.15$, c is $0 < c \leq 0.109$, (b+c) is $0 < (b+c) \leq 0.218$ and n is $0.02 \leq n \leq 0.2$.

* * * * *

UNITED STATES PATENT AND TRADEMARK OFFICE
CERTIFICATE OF CORRECTION

| | | |
|---|---|---|
| PATENT NO. | : 7,837,898 B2 | Page 1 of 1 |
| APPLICATION NO. | : 11/661926 | |
| DATED | : November 23, 2010 | |
| INVENTOR(S) | : Takeshi Takahara et al. | |

It is certified that error appears in the above-identified patent and that said Letters Patent is hereby corrected as shown below:

On the title page, Item (86), the PCT No. is incorrect. Item (86) should read:

-- (86) PCT No.:  PCT/JP2006/310526

§ 371 (c)(1),
(2), (4) Date:  Nov. 12, 2007 --

Signed and Sealed this
First Day of February, 2011

David J. Kappos
*Director of the United States Patent and Trademark Office*